(12) United States Patent
Liao

(10) Patent No.: US 7,965,011 B2
(45) Date of Patent: Jun. 21, 2011

(54) BRUSHLESS DC MOTOR STRUCTURE WITH A CONSTANT RATIO OF MAGNETIC ROTOR POLES TO STATOR SLOTS

(75) Inventor: Gordon Liao, Yung Kang (TW)

(73) Assignee: Unique Product & Design Co., Ltd., Tainan Hsien (TW)

(*) Notice: Subject to any disclaimer, the term of this patent is extended or adjusted under 35 U.S.C. 154(b) by 226 days.

(21) Appl. No.: 12/468,911

(22) Filed: May 20, 2009

(65) Prior Publication Data
US 2010/0295406 A1 Nov. 25, 2010

(51) Int. Cl.
*H02K 1/00* (2006.01)
(52) U.S. Cl. ...... 310/179; 310/184; 310/198; 310/216.1
(58) Field of Classification Search ........... 310/216.001, 310/179–187, 198
See application file for complete search history.

(56) References Cited

U.S. PATENT DOCUMENTS

| | | | |
|---|---|---|---|
| 4,774,428 A | 9/1988 | Konecny | |
| 6,242,822 B1 | 6/2001 | Strothmann et al. | |
| 6,894,417 B2 * | 5/2005 | Cai et al. | 310/198 |
| 6,979,927 B2 * | 12/2005 | Kometani et al. | 310/193 |
| 6,979,930 B2 * | 12/2005 | Harada et al. | 310/216.004 |
| 7,005,772 B1 * | 2/2006 | Frederick et al. | 310/179 |
| 7,034,428 B2 * | 4/2006 | Cai et al. | 310/198 |
| 7,067,949 B2 * | 6/2006 | Kometani et al. | 310/184 |
| 7,355,312 B2 * | 4/2008 | Kataoka et al. | 310/156.43 |
| 7,414,343 B2 * | 8/2008 | Arita et al. | 310/181 |
| 7,768,162 B2 * | 8/2010 | Asao et al. | 310/45 |
| 2005/0248229 A1 * | 11/2005 | Even et al. | 310/180 |
| 2007/0090713 A1 * | 4/2007 | Arita et al. | 310/181 |

* cited by examiner

*Primary Examiner* — Thanh Lam
(74) *Attorney, Agent, or Firm* — Alan Kamrath; Kamrath & Associates PA

(57) ABSTRACT

A brushless DC motor structure with a constant ratio of multiple rotor poles to slots of the stator is disclosed, which is characterized primarily by forming the stator of the motor by multiple ferromagnetic silicon steel sheets, where the ferromagnetic silicon steel sheets are provided with the multiple slots whose number is a multiple of 15, and the stator of the motor is formed by windings of the three phases, X, Y, and Z. Each phase includes 2 to 4 phase portions and each group has 5 slots. The rotor of the motor is made up of a plurality of arced magnets which are fixed orderly and equally along a ferromagnetic steel ring, and the radial direction of each arced magnet is opposite to that of the adjacent magnetic poles. An arced magnet represents a magnetic pole, and the number of the magnetic poles is a multiple of 14 or 16. By means of the aforementioned setting, the reduction of the cogging torque of the motor is achievable.

7 Claims, 3 Drawing Sheets

BRUSHLESS DC MOTOR STRUCTURE WITH A CONSTANT RATIO OF MAGNETIC ROTOR POLES TO STATOR SLOTS

BACKGROUND OF THE INVENTION

1. Field of the Invention

This invention generally relates to a brushless DC motor structure with a constant ratio of magnetic rotor poles to the stator slots and particularly to one capable of reducing the cogging torque of the motor.

2. Description of the Prior Art

A rotor for a permanent magnet brushless motor is made up of multiple magnetic poles. Each arced magnet is fixed to a ferromagnetic steel ring and the radial direction of each arced magnet is opposite to that of the adjacent magnetic poles. The stator is formed by a plurality of ferromagnetic silicon steel sheets, and each ferromagnetic silicon steel sheet is provided with multiple winding slots for orderly wound copper wires (enameled wires). Due to the "slot effect" during motor running as the rotor rotates relatively to the stator, the cogging torque is generated to exert on the rotor. As the motor runs at a low speed, the effect of the cogging torque is extremely obvious and brings forth loud noise and vibration. As a result, the motor speed is limited to a minimum value to prevent the vibration.

U.S. Pat. No. 4,774,428 disclosed a three-phase permanent magnet motor that it has $3(2n+1)$ slots in the stator, $3(2n+1)+1$ or $3(2n+1)-1$ permanent magnetic poles in the rotor, and $2n+1$ coils in the located slots for each phase. These designs enable to reduce the cogging torque and provide the maximum efficiency. The windings disclosed in the U.S. Pat. No. 4,774,428 are distributed $3(2n+1)$ slots to its stator and $2n+1$ slots to each phase such that the $2n+1$ successive groups of coils form one phase. As a result, each phase may have only one group of coils. For example, for $n=7$, the stator has 45 slots that corresponds to 46 or 44 poles of the rotor, and each one phase has 15 groups of coils. However, the resultant torque is not symmetric with respect to the shaft and bearing and will deteriorate the motor during operation, and this design is not considered as an ideal one.

U.S. Pat. No. 6,242,822 B1 indicated that the coils by interlaced winding for a star-connected stator are not wholly allotted to a magnetic period. That is, the ratio of the number of stator slots and the number of rotor pole pairs is a fraction, not an integer. (Two adjacent and opposite arced permanent magnets constitute one pole pair.) The aforementioned patent of the U.S. Pat. No. 4,774,428 in 1988 disclosed that the stator has $3(2n+1)$ slots in the stator, $3(2n+1)+1$ or $3(2n+1)-1$ permanent magnetic poles in the rotor. And its ratio of the number of stator slots and the number of rotor pole pairs is neither an integer. Therefore, the design of this non-integer ratio for the permanent magnet brushless motor is already a publicly known technique.

SUMMARY OF THE INVENTION

In light of the aforesaid drawbacks, this inventor conceived the idea for the improvement and eventually gave birth to this invention.

The objective of present invention is to provide a brushless DC motor structure with a constant ratio of multiple-paired rotor poles to the stator slots such that it is certainly capable of reducing the cogging torque of the motor.

To achieve the aforementioned objects, present invention is characterized primarily by: forming the stator of the motor by multiple ferromagnetic silicon steel sheets, where the ferromagnetic silicon steel sheets are provided with multiple slots whose number is a multiple of 15, and the stator of the motor is formed by windings of the three phases, X, Y, and Z, and each phase includes 2 to 4 phase portions and each phase portion has 5 stator slots; the rotor of the motor is made up of a plurality of arced magnets which are fixed orderly along a ferromagnetic steel ring, and the radial direction of each arced magnet is opposite to that of the adjacent magnetic poles, where an arced magnet represents a magnetic rotor pole and the number of the magnetic rotor poles is a multiple of 14 or 16.

DETAILED DESCRIPTION OF THE INVENTION

To achieve the foregoing objects of present invention, the techniques adopted and the achievable functions are described in detail with reference to the following preferred exemplified embodiment and the accompanying drawings for a thorough comprehension.

Figure 1:
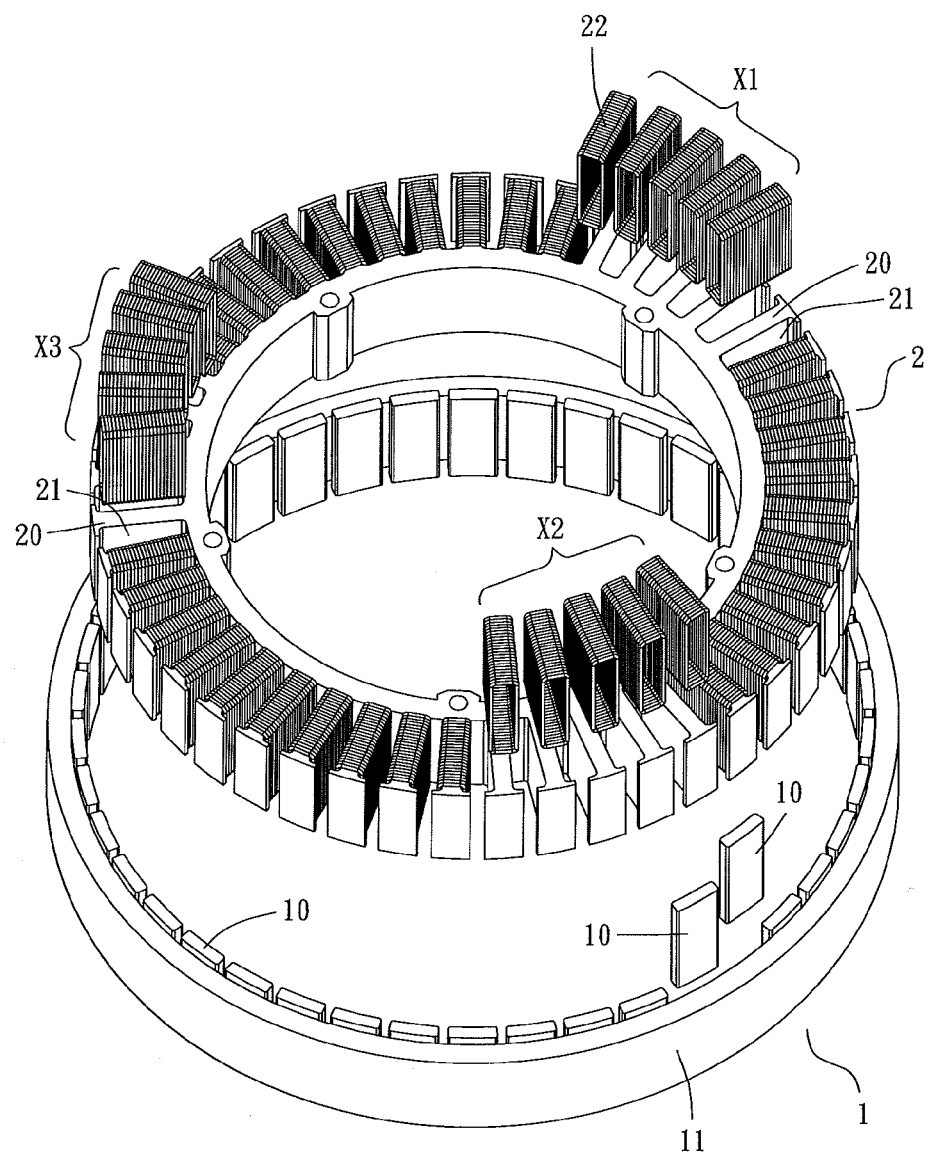
FIG. 1 is an exploded view of the structure of the exemplary embodiment of the present invention.

Referring to FIG. 1, present invention comprises a rotor 1 of the motor and a stator 2 of the motor, wherein, The rotor 1 of the motor is made up of a plurality of arced magnets 10 and a ferromagnetic steel ring 11, where each of the arced magnets 10 is fixed on the ferromagnetic steel ring 11, and the radial direction of each arced magnet 10 is opposite to that of the adjacent magnets 10, where an arced magnet 10 represents a magnetic rotor pole;

The stator 2 of the motor is formed by a plurality of ferromagnetic silicon steel sheets 20, where each of the ferromagnetic silicon steel sheets 20 provides a plurality of slots 21, and the number of the slots 21 is a multiple of 15. A coil 22 winds (for instance: enameled wire) the slots 21 of the silicon steel sheets 20 and through three phases. This invention uses X, Y, and Z to signify the three phases. Each phase comprises the number of phase portions by no less than 2. Different phase portions of the same phase are not adjacently disposed to each other, and each phase portions covers five adjacent winding slots 21. The interval between two phase portions of same phase amounts to ten slots 21. A phase portions of phase X is disposed adjacent to a phase portions of phase Y and a phase portions of phase Z, and the phase portions of the phases X, Y, and Z are disposed orderly on the stator 2 of the motor; within each phase portion, the windings for the adjacent slots 21 are in the reverse direction. As the first slot 21 on silicon steel sheets 20 is wound in a clockwise direction, the adjacent coils 22 are in a counterclockwise direction, but an adjacent coil 22 is in the same clockwise direction if it belongs to a different phase portion. Similarly, if the first slot 21 on silicon steel sheets 20 is wound in a counterclockwise direction, the adjacent coils 22 are in a clockwise direction, but an adjacent coil 22 is in the same counterclockwise direction if it belongs to a different phase portion.

In the aforesaid description, the ratio of the number of magnetic poles of the rotor 1 to the number of slots of the stator 2 is either $14n:15n$ or $16n:15n$, where n is an integer and no less than 2.

Figure 2:
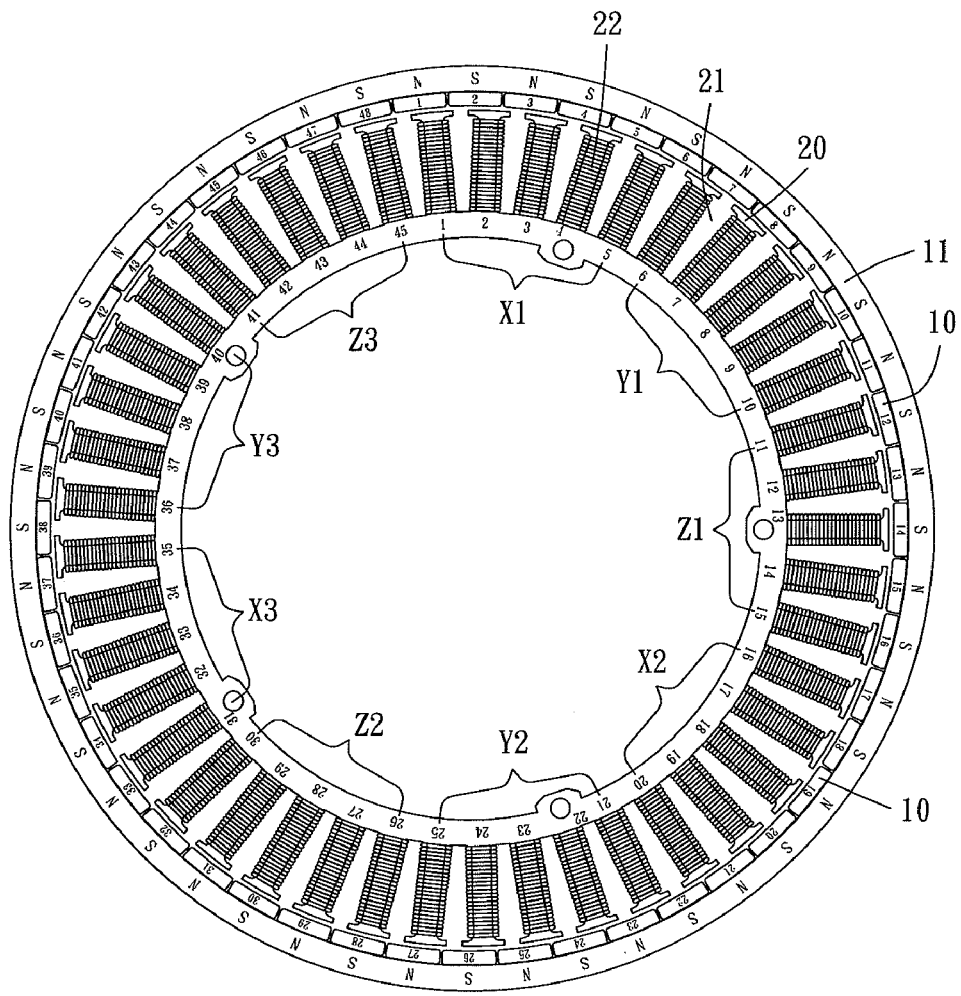
FIG. 2 is a top view of the motor structure of the exemplary embodiment of the present invention.
Figure 3:
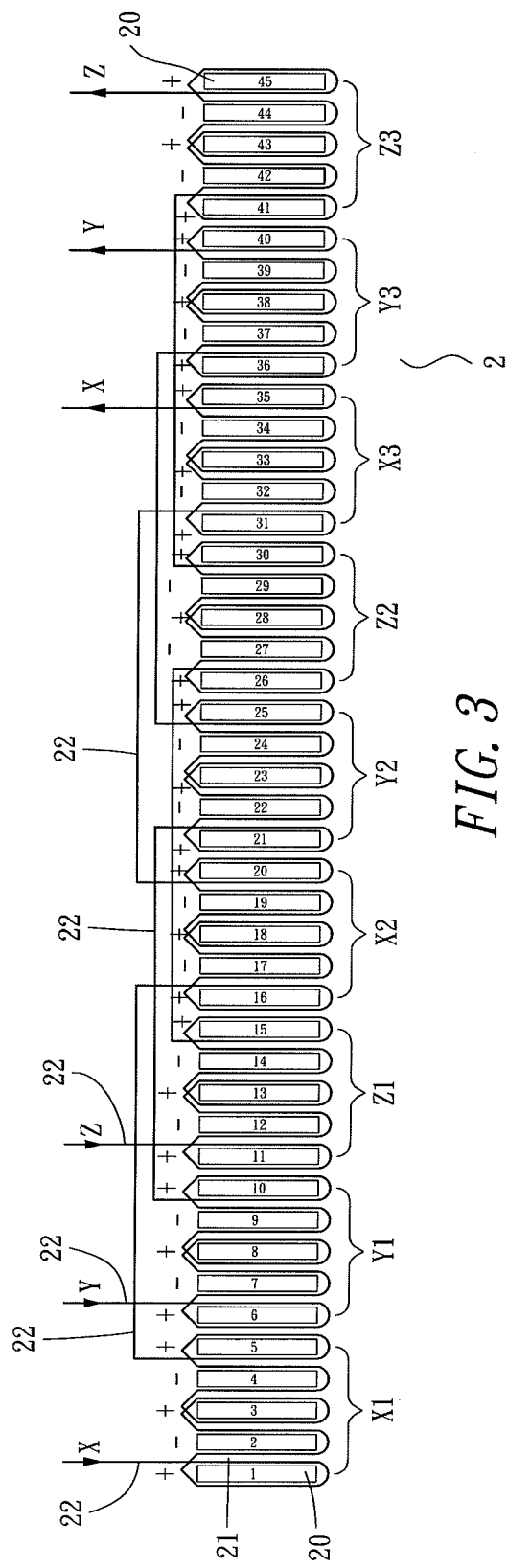
FIG. 3 is an expanded view of FIG. 2.

Referring to FIGS. 2 and 3, the ratio of the number of magnetic poles of the rotor 1 to the number of slots of the stator 2 is either $14n:15n$ or $16n:15n$, where n is an integer and no less than 2, that is, n=2, the motor structure comprises 28 rotor poles and 30 stator slots or 32 rotor poles and 30 stator slots;

n=3, the motor structure comprises 42 rotor poles and 45 stator slots or 48 rotor poles and 45 stator slots;

n=4, the motor structure comprises 56 rotor poles and 60 stator slots or 64 rotor poles and 60 stator slots;

and so forth.

A description is given for an exemplary embodiment of this invention that, for n=3, the motor comprises 42 stator poles and 45 stator slots. To be convenient for describing, the rotor 1 and stator 2 of the circular motor are expanded into a linear plot (shown in FIG. 3), which is composed of the three phases X, Y, and Z. Each phase includes three phase portions. Phase X includes three phase portions, X1, X2, and X3. Phase Y includes three phase portions, Y1, Y2, and Y3. Phase Z includes three phase portions, Z1, Z2, and Z3. Each phase portion includes five adjacent slots of coils 21. And two different phase portions of the same phase are separated by ten slots of coils 21. For instance, the winding of phase X starts from the phase portion X1, where a coil 22 (for instance: enameled wire) in the phase portion X1 winds No. 1 slot in a clockwise direction (+), No. 2 slot in a counterclockwise direction (−), No. 3 slot in a clockwise direction (+), No. 4 slot in a counterclockwise direction (−), and No. 5 slot in a clockwise direction (+). From the above steps, the winding for the first phase portion X1 of the phase X is completed. Since two phase portions of the same phase are separated by ten slots, the wire connection of the coil 22 (for instance: enameled wire) is then extended to the first slots (No. 16 of slots 21) in the phase portion X2 in a clockwise direction (+). The coil 22 in the phase portion X2 winds No. 17 slot in a counterclockwise direction (−). The coil 22 in the phase portion X2 winds No. 18 slot in a clockwise direction (+), No. 19 slot in a counterclockwise direction (−), and No. 20 slot in a clockwise direction (+). And then the winding for the second phase portion X2 of the phase X is completed. Again, the wire connection of the coil 22 (for instance: enameled wire) in the phase X is then extended to the first slots (No. 31 silicon steel sheets 20) in the phase portion X3 in a clockwise direction (+). The coil 22 in the phase portion X3 winds the No. 32 slot in a counterclockwise direction (−), No. 33 slot in a clockwise direction (+), No. 34 slot in a counterclockwise direction (−), and No. 35 slot in a clockwise direction (+). And now the winding for the entire phase portion X1, X2, and X3 of the phase X is accomplished. The way for winding the phase portions, Y1, Y2, and Y3 of the phase Y and the phase portions, Z1, Z2, and Z3 of the phase Z is exactly the same as that for the phase portions, X1, X2, and X3 of the phase X, which won't be iterated herewith. The order for all phase portions follows X1→Y1→Z1→X2→Y2→Z2→X3→Y3→Z3.

By means of the aforementioned design, the rotor 1 of the motor is made up of 42 magnets and a ferromagnetic steel ring 11, which are altogether 42 magnetic poles. Each arced magnet 10 is fixed on the ferromagnetic steel ring 11, and the radial direction of each arced magnet 10 is opposite to that of the adjacent magnetic poles 10. Accordingly, the stator 2 of the motor of this invention is formed by a plurality of ferromagnetic silicon steel sheets 20, where the ferromagnetic silicon steel sheets 20 provide a plurality of slots whose number is a multiple of 15. And the stator 2 of the motor is formed by the windings of the three phases, X, Y, and Z. Each phase includes 2 to 4 phase portions and each phase portion has 5 slots. The rotor 1 of the motor is made up of a plurality of arced magnets which are fixed orderly along a ferromagnetic steel ring, and the radial direction of each arced magnet is opposite to that of the adjacent magnetic poles. An arced magnet represents a magnetic pole, and the number of the magnetic poles is a multiple of 14 or 16. Through the mentioned setting, the reduction of the cogging torque of the motor is achievable.

To sum up, present invention is able to accomplish the expected objectives and functions, and the detailed description of the disclosure is ample enough for those skilled in the art to realize it. While present invention has been disclosed in the aforesaid with reference to the exemplified embodiments thereof, any equivalent embodiments or modifications without departing from the spirit and scope of present invention are therefore intended to be embraced.

The invention claimed is:

1. A brushless DC motor structure with a constant ratio of multiple magnetic rotor poles to stator slots, comprising a rotor and a stator of the motor, where the stator of the motor is formed by a plurality of ferromagnetic silicon steel sheets, and the ferromagnetic silicon steel sheets providing a plurality of slots whose number is a multiple of 15, and the stator of the motor being formed by windings of three phases, X, Y, and Z, where each phase includes 2 to 4 phase portions and each phase portions has 5 slots; the rotor of the motor being made up of a plurality of arced magnets which are fixed orderly and equally along a ferromagnetic steel ring, and the radial direction of each arced magnet being opposite to that of the adjacent magnetic poles, where an arced magnet represents a magnetic pole, and the number of the magnetic poles being a multiple of 14 or 16.

2. A brushless DC motor structure with a constant ratio of multiple magnetic rotor poles to the stator slots as claimed in claim 1, wherein the ratio of the number of magnetic poles of the rotor to the number of slots of the stator is 14n:15n, where n is an integer no less than 2.

3. A brushless DC motor structure with a constant ratio of multiple magnetic rotor poles to the stator slots as claimed in claim 1, wherein the ratio of the number of magnetic poles of the rotor to the number of slots of the stator is 16n:15n, where n is an integer no less than 2.

4. A brushless DC motor structure with a constant ratio of multiple magnetic rotor poles to the stator slots as claimed in claim 1, wherein different phase portions of the same phase are not adjacently disposed to each other, and the interval between two phase portions of same phase amounting to ten slots.

5. A brushless DC motor structure with a constant ratio of multiple magnetic rotor poles to the stator slots as claimed in claim 1 wherein the directions of the windings of the same phase for the adjacent slots of the stator being opposite, but the directions of the windings of the adjacent slots being same if the windings belong to different phases.

6. A brushless DC motor structure with a constant ratio of multiple magnetic rotor poles to the stator slots as claimed in claim 5, wherein within the same phase portion, the coil in the first slot being wound in a clockwise direction, in the second slot in a counterclockwise direction, in the third slot in a clockwise direction, in the fourth slot in a counterclockwise direction, and in the fifth slot in a clockwise direction.

7. A brushless DC motor structure with a constant ratio of multiple magnetic rotor poles to the stator slots as claimed in claim 5, wherein within the same phase portion, the coil in the first slot being wound in a counterclockwise direction, in the second slot in a clockwise direction, in the third slot in a counterclockwise direction, in the fourth slot in a clockwise direction, and in the fifth slot in a counterclockwise direction.

* * * * *